United States Patent [19]

Abe et al.

[11] Patent Number: 4,520,124

[45] Date of Patent: * May 28, 1985

[54] METHOD FOR PRODUCING A CATALYTIC STRUCTURE FOR THE REDUCTION OF NITROGEN OXIDES

[75] Inventors: Kazunobu Abe, Izumi; Tadao Nakatsuji, Matsubara, both of Japan

[73] Assignee: Sakai Chemical Industry Co., Ltd., Sakai, Japan

[*] Notice: The portion of the term of this patent subsequent to Jul. 28, 1998 has been disclaimed.

[21] Appl. No.: 531,468

[22] Filed: Sep. 12, 1983

Related U.S. Application Data

[60] Continuation-in-part of Ser. No. 245,687, Mar. 19, 1981, Pat. No. 4,416,800, which is a division of Ser. No. 72,599, Sep. 5, 1979, Pat. No. 4,280,926.

[51] Int. Cl.³ .................. B01J 35/04; B01J 31/28; B01J 21/14; B01J 21/12
[52] U.S. Cl. .................. 502/159; 156/89; 423/213.2; 423/239; 502/182; 502/184; 502/185; 502/242; 502/254; 502/258; 502/309; 502/350; 502/353; 502/527
[58] Field of Search .............. 502/159, 182, 185, 242, 502/254, 258, 309, 350, 353, 527; 156/89; 428/116

[56] References Cited

U.S. PATENT DOCUMENTS

| | | | |
|---|---|---|---|
| 4,113,660 | 9/1978 | Abe et al. | 423/239 A |
| 4,233,183 | 11/1980 | Inaba et al. | 423/213.2 |
| 4,280,926 | 7/1981 | Abe et al. | 423/239 |
| 4,293,447 | 10/1981 | Inaba et al. | 423/213.2 |
| 4,416,800 | 11/1983 | Abe et al. | 502/159 |

Primary Examiner—P. E. Konopka
Attorney, Agent, or Firm—Wenderoth, Lind & Ponack

[57] ABSTRACT

A method is provided for producing a catalytic structure in the form of sheet or honeycomb for the gas phase reduction of nitrogen oxides. The method comprises: beating an inorganic fiber in water to form a slurry; forming the slurry into a sheet by paper-making means and drying the sheet; impregnating the sheet or a honeycomb structure manufactured therefrom which has a porosity of 60–85% with an impregnating slurry which contains titanium dioxide or its precursor in a concentration at least of 100 g/l and has a viscosity of 5–250 cps. at normal temperatures, drying, and when necessary calcining the structure; and then immersing the structure in a solution containing a catalytically active agent or its precursor, drying and calcining the structure, thereby to provide a porous catalytic structure having titanium dioxide and the catalytically active agent substantially uniformly dispersed and supported therein.

4 Claims, 4 Drawing Figures

SECTION OF SHEET

METHOD FOR PRODUCING A CATALYTIC STRUCTURE FOR THE REDUCTION OF NITROGEN OXIDES

This is a continuation in part of Ser. No. 245,687, filed Mar. 19, 1981, now U.S. Pat. No. 4,416,800 which in turn is a divisional application of Ser. No. 72,599, filed Sept. 5, 1979, now U.S. Pat. No. 4,280,926.

The present invention relates to a method for producing a catalyst structure in the form of sheet or honeycomb for the gas phase reduction of nitrogen oxides in the presence of ammonia.

A honeycomb catalyst structure has passages therethrough parallel to the direction of the flow of gas to be treated, and thus it is advantageously used for treating a large amount of gas having a large linear velocity, as is the case of gas phase catalytic reduction of nitrogen oxides in an exhaust gas such as from boilers, internal combustion engines and nitric acid plants, since the gas under the treatment is not subjected to a large pressure drop during passage through the catalyst structure.

A further advantage of the honeycomb structure is that a suitable choice of diameter of the passage permits dusts in the gas to pass therethrough without depositing in the catalyst structure.

The honeycomb catalyst structure has been heretofore produced by several methods. In a method now most widely employed, a slurry of ceramic material such as cordierite, mullite and clay is extruded from a die directly into a honeycomb structure, which is then usually dried, sintered and coated with catalytic materials, i.e., carrier materials and catalytically active agents. According to this method, however, since such a ceramic material as a substrate is in general inactive or inert as well as poor in water-absorbency, the substrate should be repeatedly immersed in a slurry or a solution containing such a catalytic material so as to have a sufficient amount of the catalytic material supported thereon. Usually, the substrate should have a coating of the catalytic material of about 200–300 microns thick. As is apparent, the repeated immersion process results in a high production cost, but also since the ceramic substrate generally has a weak affinity for such a coating material formed thereon, the coating is liable to separate from the surface of the substrate during the gas phase reaction.

Alternatively, the ceramic honeycomb catalyst is produced by extruding a plastic material of the catalytic material themselves to obviate the above disadvantage. Although this method provides a durable honeycomb catalyst since the catalytic material is integrally incorporated therein throughout the structure, this method needs a large amount of catalytic material, resulting in high production cost. Furthermore, the plastic material is extruded under a large pressure to secure a required mechanical strength, and this results in a less porous structure which makes the catalyst less active.

In common with both of the above methods, there is a further disadvantage in that it is difficult to handle due to its weight.

Thus a honeycomb catalyst structure much lighter and easier to handle than the ceramic honeycomb catalyst structure has been proposed. For example, Japanese Patent Disclosure No. 53-55051 discloses a honeycomb catalyst which comprises a multiply corrugated board of asbestos fiber as a honeycomb substrate and catalytic materials coated thereon. However, this catalyst structure has a very low catalytic activity since asbestos is lacking in the so-called carrier effect, i.e., the action of carrier material to enhance the catalytic activity of catalytically active agents, as in the case of the ceramic substrate.

Also as in the case of the ceramic substrate, the asbestos substrate should be repeatedly immersed in or coated with the catalytic material so as to have a sufficient amount of the material carried therein, and the resultant thick coating is liable to have cracks thereon when dried or calcined. When a dense slurry or solution of the catalytic material is used, it is difficult to obtain a catalyst structure having the catalytic material uniformly carried or coated therein due to the non-uniform distribution of the material caused during the drying or calcination.

It is, therefore, an object of the present invention to provide a method for producing a highly porous catalyst structure in the form of sheet or honeycomb, low in bulk specific gravity and easy to handle, composed in inorganic fibers, wherein catalytic materials are uniformly dispersed and supported in the structure, and hence it is a further object of the invention to provide a method for producing a porous catalyst structure which has an increased catalytic activity and an increased durability due to great diffusibility of a gas through the catalyst structure.

According to the present invention, there is provided a method for producing a catalyst structure in the form of porous sheet or honeycomb for the gas phase reduction of nitrogen oxides in the presence of ammonia, which comprises:

(a) beating at least one of inorganic fibers of about 1–20 mm in fiber length and of about 0.1–30 microns in average diameter selected from the group consisting of ceramic fiber, silica fiber, silica-alumina fiber, chrysotile fiber, asbestos fiber, rock wool, glass fiber, anthophyllite fiber, potassium titanate fiber and carbon fiber, in water, to form a stock material containing the solid components in an amount of 1–10% by weight;

(b) forming the stock material into a sheet by paper making means and drying the sheet which has a void fraction of 65–80%;

(c) impregnating the sheet or a honeycomb structure manufactured therefrom which an impregnating slurry containing titanium dioxide as a carrier material or its precursor which will be converted into titanium dioxide when calcined in a concentration at least of 100 g/l and having a viscosity of 5–250 cps. at normal temperature, drying, and when necessary calcining the structure; and (d) immersing the structure in a solution containing at least one catalytically active agent of an oxide selected from the group consisting of Cu, Fe, V, W and Mo or their precursors which will be converted into the oxides when calcined, drying and calcining the structure.

The inorganic fiber used in the invention is such that it is capable of being beaten and is preferably stable at least at a temperature of about 200° C., and has preferably a diameter of about 0.1–30 microns and a fiber length of about 1–20 mm. The inorganic fiber is selected from the group consisting of ceramic fiber, silica fiber, silica-alumina fiber, asbestos fiber, chrysotile fiber, anthophyllite fiber, glass fiber, rock wool, potassium titanate fiber and carbon fiber. Ceramic fiber, alumina fiber, silica-alumina fiber and asbestos fiber are most preferred since these fibers have an excellent formability into a sheet and a honeycomb structure. A heat resistant organic fiber such as polytetraethylene fiber may be used together with the inorganic fiber, if necessary.

The fiber used depends on one hand upon the conditions, in particular the temperature under which the gas phase reduction of nitrogen oxides is carried out in the presence of the catalyst structure produced from the fiber. For example, ceramic fiber and asbestos fiber are suitably selected when the reaction temperature is below about 500° C., and silica fiber is preferred when the reaction temperature is about 500°–1000° C.

Furthermore, a combustible organic fiber which is burnt away when being calcined may be used together with the inorganic fiber to control the porosity of sheet or honeycomb structure. The combustible organic fiber includes rayon fiber, cellulosic fiber, vinylon fiber, polypropylene fiber, acrylic fiber and polyester fiber. The combustible organic fiber increases the mechanical strength of a sheet made from a slurry of a mixture of the inorganic fiber and the organic fiber, and hence the formability to a honeycomb structure which will be set forth hereinafter. Preferably the organic fiber has a fineness not more than 3 deniers and a fiber length of about 3–10 mm, and is used in amounts of 1–30% by weight, most preferably 2–20% by weight based on the inorganic fiber used.

The inorganic fiber and if any, together with the above mentioned organic fibers, are beaten in water so as to provide a stock material which permits the fibers to form a sheet, and the stock material is therefore so prepared as to contain the solid components, i.e., the fiber, preferably in amounts of about 1–10% by weight, more preferably about 2–6% by weight. Since sheets of inorganic fibers and a mixture of inorganic fiber and organic fiber per se and methods of producing such sheets are already known in the art of paper making, no further explanation is herein provided regarding the beating and sheet forming of the fiber.

According to the invention, the fiber slurry preferably contains additives such as a binder, a fixing agent and a sizing agent known in the art of paper making, which will be hereinafter described. The fiber slurry may further contain solid titanium dioxide or its precursor such as titanium hydroxide which will be converted into the dioxide when calcined so that the dioxide may serve as a carrier material uniformly dispersed and supported in advance in the resultant sheet. Titanium dioxide or its precursor added to the fiber slurry has preferably a particle size of 0.01–50 microns, most preferably 0.1–10 microns so as to be fixed on the fiber in the slurry in a high yield. The stock material is so prepared as to contain the solid components, i.e., the fiber and the carrier material, in amounts of about 1–10% by weight. The solid component preferably consists of not more than about 40% by weight, preferably not more than 30% by weight of titanium dioxide or its precursor and not less than 60% by weight, preferably not less than 70% by weight of fibers. When the solid component contains more than about 40% by weight of carrier material, the stock material will fail to provide a sheet which has a high porosity to permit the uniform distribution of catalytic material in the structure and a sufficient mechanical strength to form a corrugated sheet for a honeycomb structure.

As indicated hereinbefore, the stock material preferably contains a binder. The binder is added to the fiber slurry in amounts of 0.01–10% by weight based on the solid component in the stock material. The binder suitably used in the invention is an inorganic binder such as alumina sol, silica sol and titania sol, and an organic binder such as latexes of synthetic rubber, in particular, acrylonitrile-butadiene rubber (NBR) and styrene-butadiene rubber (SBR). The stock material may further contain a fixing agent and/or a sizing agent. The fixing agent preferably used is an organic cationic polyelectrolyte such as polyacrylamine, polyamine, polyamine- and polyamide-epichlohydrin condensation polymer and polyethyleneimine. The polyamine includes condensates of alkylene dichlorides with alkylenepolyamines such as ethylenediamine, tetramethylenediamine and hexamethylenediamine, poly(N,N-dimethyl- and diethylamino-methacrylate), polyvinylimidazoline, polyvinylpyridine, cycloaddition polymers of diallylamine, copolymers of N-vinylpyrolidone and acrylamides. An inorganic fixing agent such as aluminum sulfate and ferric sulfate may also be used. The amount of fixing agent in the stock material is preferably in the range of about 1–10% by weight based on the carrier material or its precursor therein. The stock material may contain a sizing agent in an amount of 0.01–1% by weight based on the solid components. Rosins and organosilicone polymers, for example, polysiloxanes, may be used as the sizing agent.

In more detail, however, for an illustrative example only, the stock material may be prepared as follows. The fiber is beaten in water to form an aqueous slurry, and then if desired, is added thereto and mixed therewith titanium dioxide or its precursor. Then, when desired, a fixing agent and/or a sizing agent are added to the fiber slurry, followed by the addition of a mineral acid such as sulfuric acid to arrange the resultant mixture at a pH of about 3–6, preferably of about 4–5. On the other hand, when a fixing agent is not used in the stock preparation, the fiber slurry is so prepared as to have a pH of about 6–8. Finally, when desired, a binder is added to the fiber slurry, and is then arranged so as to have a solid component of 1–10% by weight, preferably 2–6% by weight for paper making process.

The stock material thus prepared is then formed into a dried sheet by a conventional paper making machine such as the cylinder machine, a Fourdrinier machine and the short wire machine. The stock material may be hand-made into a sheet by a hand-mold. The resultant wet sheet is dried usually at temperatures of about 60°–150° C. When a fiber of high melting point is used, the sheet may be dried at a higher temperature.

According to the invention, the sheet or a honeycomb structure made therefrom for supporting the catalytic material therein has a porosity of 60–85%, wherein the porosity is defined as [1-(apparent density of sheet or honeycomb)/(true density of sheet or honeycomb)]×100 (%), the apparent density of honeycomb meaning the apparent density of wall forming the honeycomb structure. In this connection, it is advantageous to prepare a sheet from the stock material which contains the combustible organic fiber and to calcine the sheet or a honeycomb manufactured therefrom to burn away the organic fiber and control the porosity of the sheet or honeycomb structure.

According to the invention, the porous sheet or a honeycomb structure manufactured therefrom is first impregnated with an aqueous slurry or solution containing titanium dioxide as a carrier material or its precursor, dried and when necessary calcined to convert the precursor into the active dioxide. However, the calcination may be omitted at this stage, and the sheet or honeycomb structure may be finally calcined after supporting the catalytically active agent or its precursor.

The impregnating slurry contains titanium dioxide or its precursor in a concentration at least of 100 g/l, preferably 100–1000 g/l and is still required to possess a viscosity of 5–250 cps. at normal temperature. That is, as a feature of the method of the invention, since the sheet or honeycomb structure which has a porosity of 60–85% is impregnated with the impregnating slurry containing titanium dioxide or its precursor in a concentration of about 100–1000 g/l and having a viscosity of 5–250 cps. at normal temperature, the carrier material permeates through the porous structure and is distributed substantially uniformly in the structure. A slurry of which viscosity is more than about 250 cps. at normal temperature has difficultly in permeating through the structure even if the structure has a high porosity as defined as above, and therefore the structure has the carrier material only on the limited surface layers of the structure, and hence a low catalytic activity and durability.

Commercially available titanium dioxide produced by the sulfuric acid process usually contains free sulfate ions therein in amounts of about 7–15% by weight based on the titanium dioxide, and the free sulfate ions have been found to remarkably increase the viscosity of an aqueous slurry prepared by the use of such titanium dioxide. Therefore, as a preferable embodiment of the invention, titanium dioxide which has less or substantially no free sulfate ions therein is used for the preparation of the impregnating slurry. Such titanium dioxide may be obtained by treating metatitanic acid cake, which is readily available as an intermediate in the production of titanium dioxide by the sulfuric acid process, with a water-soluble barium salt such as barium chloride and barium nitrate to fix the free sulfate ions as water-insoluble barium sulfate, and then by calcing the metatitanic acid at temperatures preferably of 300°–600° C. for 1–5 hours to provide titanium dioxide which has less amount of or substantially no free sulfate ions therein and at the same time a large specific surface area.

As another method, metatitanic acid is treated with ammonia water to form water-soluble ammonium sulfate which is then washed out from the metatitanic acid cake. The calcination of the cake in the same conditions as above provides titanium dioxide which has a lesser amount of or substantially no free sulfate ions. It is preferred that titanium dioxide is so treated as to contain free sulfate ions at most about 4% by weight based on the resultant titanium dioxide.

As a further feature, the titanium dioxide thus prepared has a specific surface area of 50–100 m$^2$/g as hereinbefore referred to. The calcination of the conventional commercially available titanium dioxide from the sulfuric acid process at high temperatures, e.g., about 1000° C. or more, may also provide titanium dioxide which is reduced in amounts of free sulfate ions, but the titanium oxide thus treated has a remarkably reduced specific surface area of about 10 m$^2$/g or less, so that it fails to have an effective carrier effect. On the contrary to the above, the impregnating slurry used in the invention contains titanium dioxide of a larger specific surface area in a large amount, and it still has a smaller viscosity, and therefore the catalytic structure has a higher catalytic activity based on the increased carrier effect of titanium dioxide uniformly supported in the structure.

The sheet or the honeycomb, after being impregnated with the impregnating slurry to support the carrier material therein, is then immersed in an aqueous solution which contains a catalytically active agent or its precursor which will be converted into the active oxide when being calcined. The solution has a smaller viscosity than the impregnating slurry of the carrier material so that the active agent or its precursor permeates through the porous structure which has still a large porosity after having the carrier material supported therein, and therefore the active agent or its precursor is also substantially uniformly dispersed and supported in the structure. Then the sheet or the honeycomb is dried to provide a catalyst structure. When the sheet or the honeycomb is immersed in a solution containing a precursor of the active agent, it is necessary to calcine the structure to convert the precursor into the active oxide form.

The catalytically active agent used in the invention is at least one oxide selected from the group consisting of Cu, Fe, V, W and Mo or their precursors which will be converted into the active oxides when calcined. The precursor includes, for example, water-soluble vanadium oxalate and metatungstic acid which are converted into V$_2$O$_5$ and WO$_3$ when calcined, respectively.

The sheet or honeycomb is dried after it is impregnated with the impregnating slurry and also after the sheet or honeycomb is immersed in the immersing solution. The drying temperature in both the stages is usually room temperature to about 200° C. although not restricted to this range of temperature. Similarly the temperature when the sheet or honeycomb is calcined after the precursor of titanium dioxide or active agents are supported in the structure is preferably between from 300° C. to 600° C. The calcination is carried out usually for 1–5 hours.

The calcination serves also to burn away the combustible organic fiber when the fiber is contained in the sheet or honeycomb structure. As indicated hereinbefore, the combustible organic fiber is burnt away to increase the porosity of the structure and therefore serves to control the porosity of the structure. For example, when the sheet or honeycomb structure is calcined before the carrier material is supported therein, the amount of carrier material supported is controllable by the amount of the fiber in the structure, and when the structure is calcined after the catalytically active agent is supported therein, the porosity of the catalyst structure, and hence the diffusibility of a gas through the structure is controllable by the amount of the fiber in the structure.

The impregnating slurry may contain about 1–10 parts by weight of the same fiber as used in the preparation of stock material in relation to 100 parts by weight of the carrier material. The fiber improves the mechanical strength and durability of catalyst structure obtained, in particular, the adhesive strength of the catalytic material and scratch resistance of the structure, but also prevents the generation of cracks thereon otherwise often appear on the catalytic material when dried. The fiber used for the above purpose preferably has a fiber length of about 0.5–5 mm and a diameter of about 0.1–30 microns.

In the invention, the honeycomb structure includes any structure known as a honeycomb structure in the art, and the method for producing the same is not restricted to any particular one, but includes those which are known in the art. However, a multiply corrugated structure is a preferably employed honeycomb structure in the invention. The honeycomb catalyst structure is usually held in a basket and is charged in a reactor so that the passages of the honeycomb are parallel to the direction of gas flow to be treated in the reactor.

A further honeycomb structure is formed by rolling a single-faced corrugated board made from the sheet of the invention with the tops of the corrugation glued to the back side of the sheet as a linerboard. A still further honeycomb structure is formed by arranging the sheets of the invention parallel to each other at a distance in a basket or a frame to form passages between the sheets.

In the gas phase reduction of nitrogen oxides using the catalyst structure of the invention, ammonia as a reducing agent is added in amounts of about 0.5–10 times as much as the stoichiometric amount required to convert nitrogen oxides into nitrogen and water, to a gas composition such as an exhaust gas from boilers which contains nitrogen oxides, and the resulting gas mixture is passed through the catalyst structure a temperatures of 150°–650° C., preferably 200°–550° C. at an area velocity of 5–50 $Nm^3/m^2 \cdot hr$. The pressure under which the reaction is carried out is not limited, but is usually between from the normal pressure to about 10 $Kg/cm^2$.

As set forth above, the sheet or the honeycomb catalyst structure of the invention has titanium dioxide as a carrier material and a catalytically active agent substantially uniformly supported therein so that the catalyst structure has an improved catalytic activity and durability in the gas phase reduction of nitrogen oxides in the presence of ammonia as a reducing agent, contrary to the prior art catalysts which have catalytic materials only on limited surface layers of the catalyst structure. In more detail, since the catalyst structure of the invention maintains a large porosity even after supporting the carrier material and active agent and permits the gas to readily diffuse through the structure, the catalyst structure has a high catalytic activity. Moreover since the structure has the catalytic material substantially uniformly supported therein in the porous structure, it maintains a high activity over a long period of time even when portions of catalytic material on the surface layers are abraded away from the structure by dusts in the gas.

The invention will be understood more readily with reference to the following examples; however, these examples are intended to illustrate the invention only and are not to be construed as limiting the scope of the invention.

A. Preparation of Catalysts

EXAMPLE 1

1.5 Kg of ceramic fiber (Fineflex 1300, Nichiasu K.K.) of about 3 microns in average diameter and about 10 mm in average fiber length were beaten in 30 l of water, and to the resultant slurry was added 500 g of anatase titanium dioxide powder about 2 microns in average particle size and 80 $m^2/g$ in specific surface area together with 10 g of cationic polyelectrolyte (Lufax 295, Rohm & Haas), and then sulfuric acid to adjust the slurry at a pH of 4.5, followed by the addition of 1 g of acrylonitrile-butadien copolymer latex binder (Nipol 1571, Nihon Geon K.K.) to fix the titanium dioxide on the fiber.

The resultant stock material was hand-made into a sheet by a hand mold, and dried. The sheet was 0.3 mm in thickness and 140 $g/m^2$ in weight.

The sheet was then corrugated to form a single-faced corrugated sheet by a conventional corrugating machine using silica sol as an adhesive. Then the corrugated sheets were piled up together one on the other with silica sol to provide a multiply corrugated structure as a honeycomb structure having a volume of 86 ml with a porosity of 68% and a contact surface area of $860 \times 10^{-2}$ $cm^2/cm^3$ which is defined as the area of the surface which a gas composition makes contact with in the reaction.

Metatitanic acid from the sulfuric acid process in the production of titanium dioxide was neutralized by the addition thereto of ammonia water, and the resultant ammonium sulfate was dissolved in water and removed from the metatitanic acid, which was in turn then calcined at a temperature of 450° C. for 3 hours to provide titanium dioxide 80 $m^2/g$ in specific surface area which contained sulfate ions in an amount of 0.8% by weight in terms of sulfuric acid. A mixture of 180 g of above titanium dioxide, 144 ml of silica sol and 288 ml of water was ball-milled for 5 hours to provide an aqueous impregnating slurry having 375 g/l of titanium dioxide and a viscosity of 19 cps. at the normal temperature.

The above honeycomb structure was wash-coated in the impregnating slurry, dried and calcined at a temperature of 450° C. for 3 hours to provide a honeycomb carrier structure having 12.50 g of titanium dioxide supported therein.

Then the carrier structure was immersed in an aqueous solution of vanadyl oxalate of a concentration of 95 g/l in terms of $V_2O_5$. Thereafter the structure was dried and calcined at a temperature of 450° C. for 3 hours to provide a honeycomb catalyst structure having 13.13 g of a mixture of $TiO_2$ and $V_2O_5$ supported therein with a weight ratio of 95 to 5, i.e., $2.65 \times 10^{-2}$ g of the dioxides or catalytic material per contact surface area.

EXAMPLE 2

1.5 Kg of the same ceramic fiber as used in the previous example were beaten together with 120 g of rayon fiber of 1.5 denier and 5 mm in average fiber length in 30 l of water. The resultant stock material was formed into a sheet and dried in the same manner as in EXAMPLE 1. The sheet was 0.3 mm in thickness and 80 $g/m^2$ in weight.

The sheet was then formed into a honeycomb structure in the same manner as in EXAMPLE 1 having the same volume and contact surface area and a porosity of 76%.

The same metatitanic acid as used in EXAMPLE 1 was treated with barium chloride to fix 40% of sulfate ions therein as barium sulfate and was then calcined at a temperature of 450° C. for 3 hours to provide titanium dioxide having a specific surface area of 97 $m^2/g$ and sulfate ions in an amount of 3.2% by weight based on titanium dioxide in terms of sulfuric acid. A mixture of 180 g of the titanium dioxide, 195 ml of silica sol and 265 ml of water was ball-milled for 5 hours to provide an impreganating slurry having titanium dioxide in a concentration of 360 g/l and a viscosity of 68 cps. at the normal temperature.

The above honeycomb structure was wash-coated twice in the impregnating slurry and calcined at a temperature of 450° C. for 3 hours so that the structure supported therein 20.31 g of titanium dioxide.

The structure was then immersed for ten minutes in an aqueous solution containing vanadyl oxalate in a concentration of 115 g/l in terms of $V_2O_5$, dried and calcined at a temperature of 450° C. for 3 hours to provide a honeycomb catalyst structure having a mixture of $TiO_2$ and $V_2O_5$ in an amount of 21.33 g with a weight ratio of 95 to 5, i.e., $2.88 \times 10^{-2}$ g per contact surface area.

EXAMPLE 3

500 g of asbestos fiber about 8 microns in average diameter and about 2 mm in average fiber length were beaten in 20 l of water. To the resultant slurry of fiber was added 175 g of anatase titanium dioxide about 0.5 microns in average particle size and 50 $m^2/g$ in specific surface area and then ammonia water to make the slurry at a pH of 8. To the resultant slurry were added 0.7 g of Lufax 295 and sulfuric acid to further adjust the slurry at a pH of 4, followed by the addition thereto of Nipol 1571 to fix titanium dioxide on the fiber.

The resultant stock material was hand-made into a sheet and dried in the same manner as in EXAMPLE 1. The sheet was 0.3 mm in thickness and 230 $g/m^2$ in weight. The sheet was formed into the same honeycomb structure as in EXAMPLE 1, but it had a porosity of 62%.

A mixture of 180 g of the same titanium dioxide as used in the preparation of the impregnating slurry in EXAMPLE 1, 144 ml of silica sol and 288 ml of water was ball-milled for 1 hour to provide an aqueous impregnating slurry which contained titanium dioxide in a concentration of 375 g/l and a viscosity of 19 cps. at the normal temperature. The above honeycomb structure was wash-coated in the slurry, dried and calcined at at temperature of 450° C. for 3 hours to provide a carrier structure supporting 13.01 g of $TiO_2$ therein.

The structure was then immersed in an aqueous solution containing vanadyl oxalate and metatungstic acid in concentrations of 22 g/l and 176 g/l in terms of $V_2O_5$ and $WO_3$, respectively, dried and calcined at a temperature of 450° C. for 3 hours to support therein a mixture of $V_2O_5$ and $WO_3$. The thus prepared catalyst structure supported therein a mixture of $TiO_2$, $V_2O_5$ and $WO_3$ in an amount of 21.46 g with a weight ratio of 91/1/8, i.e., $2.90 \times 10^{-2}$ g of the mixed oxides per contact surface area.

EXAMPLE 4 1.5 Kg of ceramic fiber (Fineflex, Nichiasu K.K.) about 3 microns in average diameter and about 20 mm in average fiber length and 180 g of rayon fiber 1.5 denier and about 5 mm average diameter were beaten in 30 l of water. The resultant stock material was formed into a sheet in the same manner as in EXAMPLE 1. The sheet was 0.3 mm in thickness and 71 $g/m^2$ in weight. The sheet was then formed into a honeycomb structure having the same volume and contact surface area as that of EXAMPLE 1, but had a porosity of 82%.

The same metatitanic acid as used in EXAMPLE 1 in the preparation of titanium dioxide impregnating slurry was treated with barium chloride to remove 20% of sulfate ions therein as barium sulfate, and calcined at a temperature of 450° C. for 3 hours to provide titanium dioxide having a specific surface area of 115 $m^2/g$ and sulfate ions in an amount of 3.8% by weight in terms of sulfuric acid based on the resulting titanium dioxide.

A mixture of 180 g of the titanium dioxide, 195 ml of silica sol and 265 ml of water was ball-milled for 5 hours to provide an impregnating slurry containing titanium dioxide in a concentration of 360 g/l and having a viscosity of 110 cps. at the normal temperature.

The above honeycomb structure was wash-coated twice in the slurry, dried and calcined at a temperature of 450° C. for 3 hours to provide a carrier structure having titanium dioxide in an amount of 20.49 g supported therein. The structure was then immersed in an aqueous solution containing vanadyl oxalate in a concentration of 120 g/l in terms of $V_2O_5$, dried and calcined at a temperature of 450° C. for 3 hours to provide a catalyst structure having a mixture of $TiO_2$ and $V_2O_5$ in an amount of 21.65 g with a weight ratio of 95 to 5, i.e., $2.93 \times 10^{-2}$ g of the mixed catalytic material per contact surface area.

EXAMPLE 5

A mixture of 350 g of asbestos fiber about 8 microns in average diameter and about 2 mm in average fiber length and 150 g of glass fiber (E Glass, Nittobo, K.K.) about 6 microns in average diameter and about 5 mm in average fiber length was beaten in 20 l of water. To the resultant slurry was added 1 g of Nipol 1571, and the resultant stock material was formed into a sheet 0.3 mm in thickness and 135 $g/m^2$ in weight. The sheet was then formed into a honeycomb structure of the same volume and contact surface area as that of EXAMPLE 1, but having a porosity of 69%.

The same metatitanic acid as used in EXAMPLE 1 in the preparation of impregnating slurry was made neutral by the addition thereto of ammonia water to remove sulfate ions therein, and then calcined at a temperature of 450° C. for 3 hours to provide anatase titanium dioxide 87 $m^2/g$ in specific surface area containing sulfate ions in an amount of 1.4% by weight based on titanium dioxide in terms of sulfuric acid.

An aqueous slurry was prepared which contained the above titanium dioxide in a concentration of 385 g/l and had a viscosity of 35 cps. at normal temperature, and in this slurry the above honeycomb structure was wash-coated twice, dried and calcined at a temperature of 450° C. for 3 hours to provide a honeycom carrier structure having titanium dioxide in an amount of 21.24 g therein. Then the structure was immersed for 10 minutes in aqueous solution containing vanadyl oxalate in a concentration of 115 g/l in terms of $V_2O_5$, dried and calcined at a temperature of 450° C. for 3 hours to provide a catalyst structure having a mixture of $TiO_2$ and $V_2O_5$ in an amount of 22.30 g with a weight ratio of 95 to 5, i.e., $2.87 \times 10^{-2}$ g of the mixed oxides per contact surface area. REFERENCE EXAMPLE 1

Porous metal sheets each 1.5 mm thick (Sumitomo Denki Kogyo K.K.) were formed into corrugated plates, which were then piled up together one on the other to form a honeycomb structure having a volume of 173 ml and a contact surface area of $427 \times 10^{-2}$ $cm^2/cm^3$.

A mixture of 171 g of the same titanium dioxide as used in the preparation of impregnating slurry in EXAMPLE 1, 9 g (in terms of $V_2O_5$) of vanadyl oxalate and 288 ml of water was ball-milled for 5 hours to provide an impregnating slurry having a viscosity of 25 cps,. at the normal temperature.

The honeycomb structure was wash-coated in the slurry, dried and calcined at a temperature of 450° C. for 3 hours to provide a catalyst structure having a mixture of $TiO_2$ and $V_2O_5$ supported therein in an amount of 13.82 g with a weight ratio of 95 to 5. That is, the catalyst structure had the catalytic material in an amount of $3.76 \times 10^{-2}$ g per contact surface area.

REFERENCE EXAMPLE 2

76 ml of a commercially available honeycomb structure of sintered ceramic oxides (Japan Tokushu Togyo K.K.) having a wall thickness of 0.33 mm, a pitch of 3.75 mm, and hence a contact surface area of $973 \times 10^{-2}$ cm$^2$/cm$^3$ was wash-coated in the same impregnating slurry as used in REFERENCE EXAMPLE 1 three times, and then worked up in the same manner as in REFERENCE EXAMPLE 1 to provide a honeycomb catalyst structure having TiO$_2$ and V$_2$O$_5$ supported thereon in an amount of 14.15 g with a weight ratio of 95 to 5, i.e., $2.28 \times 10^{-2}$ g of the catalytic material per contact surface area.

REFERENCE EXAMPLE 3

A mixture of 180 g of titanium dioxide having free sulfate ions in an amount of 8.2% by weight and a specific surface area of 130 m$^2$/g, 195 ml of silica sol and 265 ml of water was ball-milled for 5 hours to provide an impregnating slurry which contained titanium dioxide in a concentration of 360 g/l and a viscosity of 897 cps. at the normal temperature.

The same honeycomb structure of 76% in porosity as used in EXAMPLE 2 was wash-coated in the impregnating slurry, dried and calcined at a temperature of 450° C. for 3 hours to provide the carrier structure supporting titanium dioxide in an amount of 24.63 g therein.

Then the carrier structure was worked up in the same manner as in EXAMPLE 2 to provide a catalyst structure having a mixture of TiO$_2$ and V$_2$O$_5$ in an amount of 25.87 g with a weight ratio of 95 to 5, i.e., $3.48 \times 10^{-2}$ g of the mixed oxides per contact surface area.

REFERENCE EXAMPLE 4

A mixture of 180 g of the same titanium dioxide having free sulfate ions in an amount of 3.2% by weight and a specific surface area of 97 m$^2$/g as used in the preparation of impregnating slurry, 195 ml of silica sol, 47 ml of aqueous solution containing vanadium oxalate in a concentration of 200 g/l in terms of V$_2$O$_5$ and 218 ml of water was ball-milled for 5 hours to provide a slurry of 77 cps. in viscosity at the normal temperature.

The same honeycomb structure of 76% in porosity as used in EXAMPLE 2 was impregnated with the above slurry, dried and calcined at a temperature of 450° C. for 3 hours to provide a honeycomb catalyst structure having a mixture of TiO$_2$ and V$_2$O$_5$ in an amount of 23.70 g with a weight ratio of 95 to 5, i.e., $3.2 \times 10^{-2}$ g of the catalytic material per contact surface area.

B. Properties of Catalysts

Figure 1:
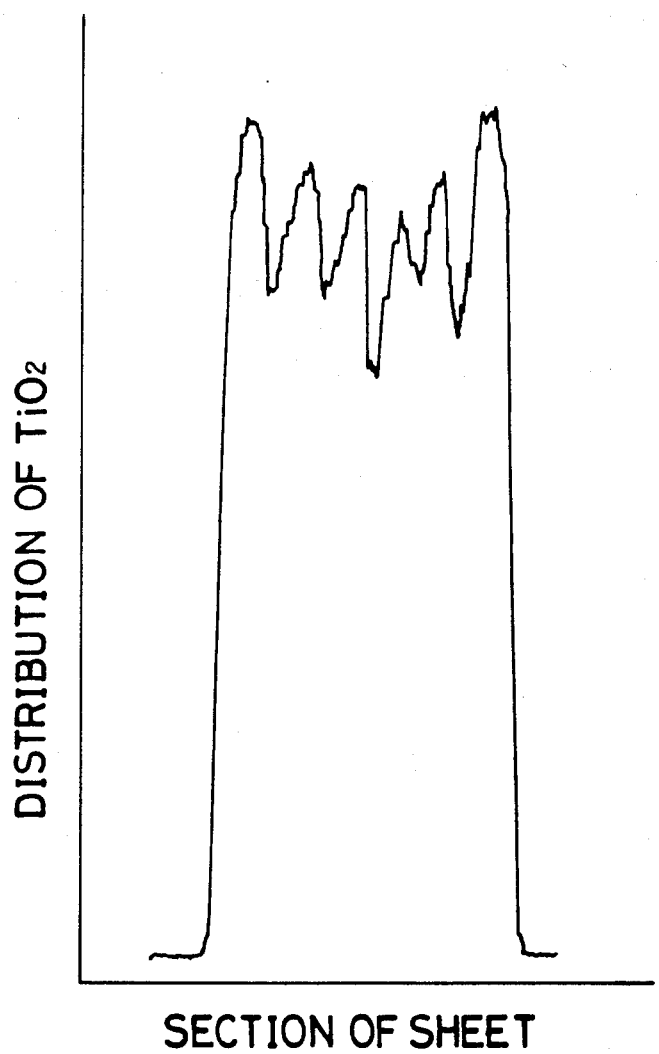
FIGS. 1, 2 and 3 illustrate the distribution of titanium dioxide along the direction of thickness of the wall forming the honeycomb structure of honeycomb catalysts of EXAMPLES 1, 2 and 3, respectively, by an X-ray microanalyzer. Apparently titanium dioxide is substantially uniformly dispersed and supported in the structure.
Figure 2:
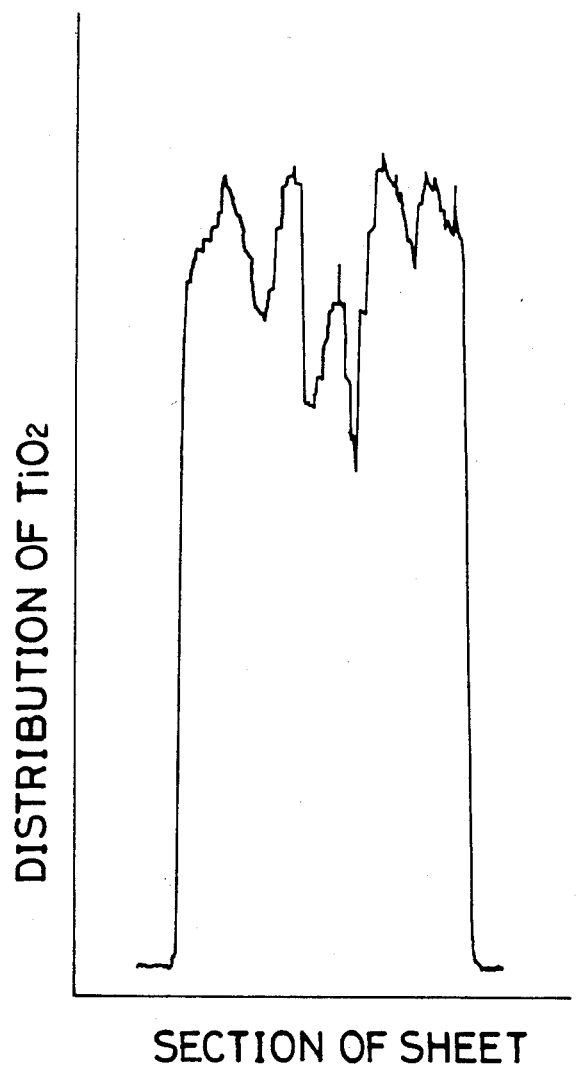
Figure 3:
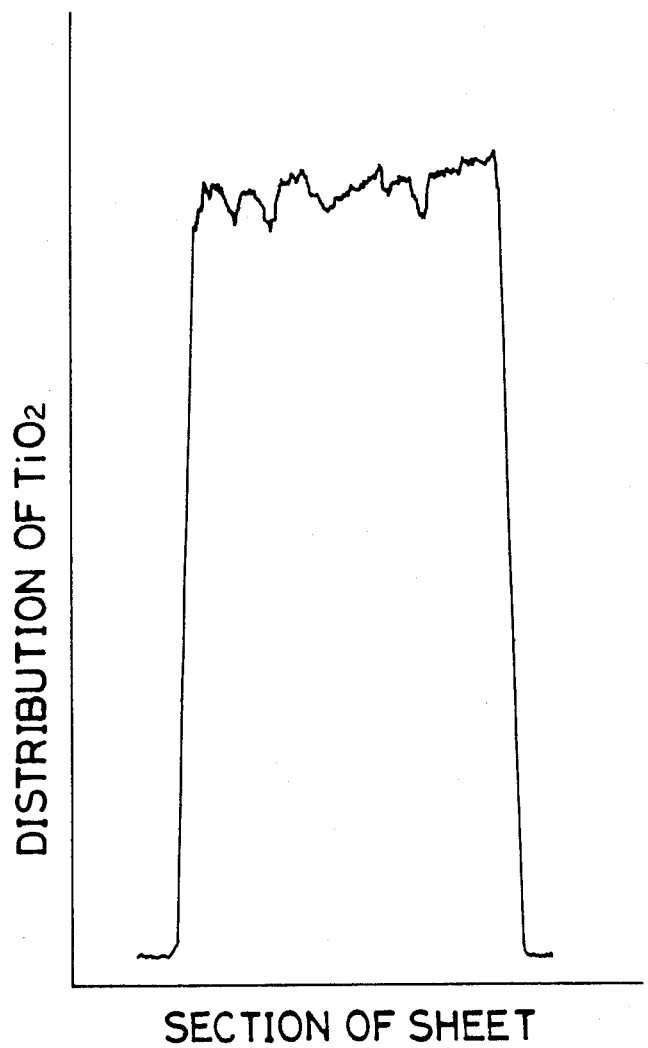
Figure 4:
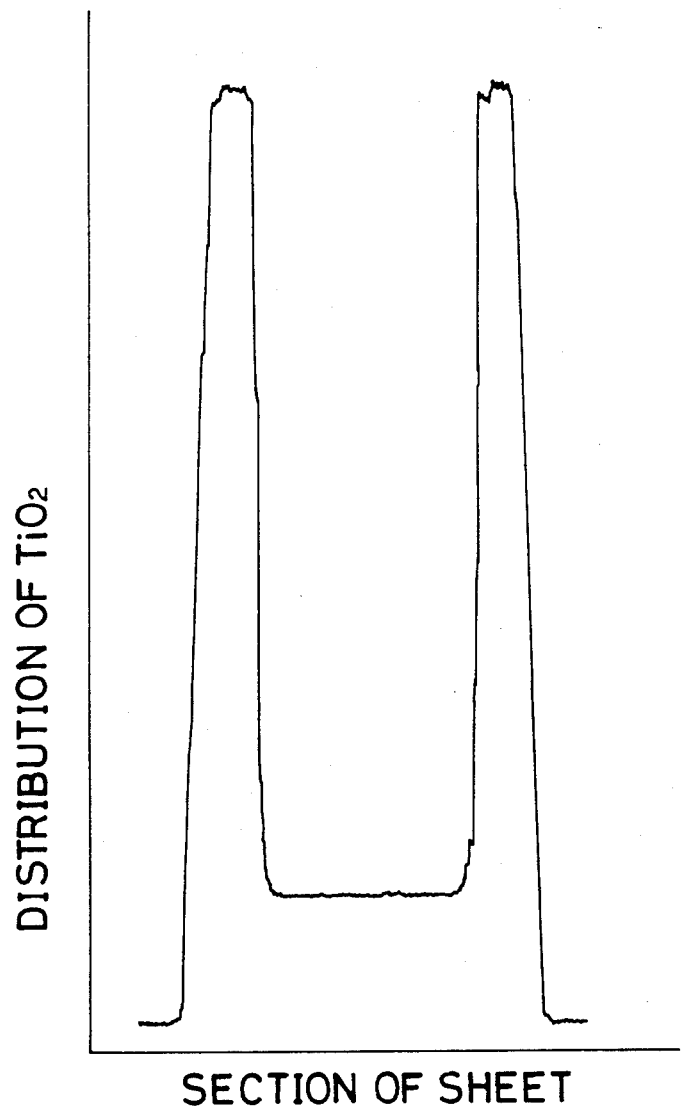
FIG. 4 illustrate the distribution of titanium dioxide in the honeycomb catalyst of REFERENCE EXAMPLE 3. Titanium dioxide is supported on the limited surface layers of the structure since the impregnating slurry used has a large viscosity.

The catalytic activity of the above catalysts structures in the gas phase reduction of nitrogen oxides in terms of the conversion of nitrogen monoxide (NO) into nitrogen and water in the presence of ammonia was determined. Each catalyst structure was charged in a Pyrex tube 50 mm in inner diameter with a heat insulator wrapped therearound to maintain the temperature therein constant. A gas mixture of 200 ppm of NO, 200 ppm of ammonia, 10% by weight of water vapor, 12% by volume of carbon dioxide, 1000 ppm of sulfur dioxide, and the residue nitrogen was passed through the catalyst at a temperature of 350° C. at an area velocity of 20 Nm$^3$/m$^2$.hr.

The conversion of NO was calculated from the following equation: [(NO concentration at the inlet)−(NO concentration at the outlet)]/(NO concentration at the inlet)×100(%). The results are shown in TABLE 1.

To estimate the durability of the catalyst structures, each catalyst was rapidly heated to a temperature of 450° C. in an electric furnace and then was quickly taken out therefrom to cool to room temperature in the atmosphere. After this operation was repeated ten times, the catalyst structure was shaken for 15 minutes in a shaker, and the amount of catalytic material separated from the catalyst structure was measured. The results are shown in TABLE 1.

TABLE 1

|  | EXAMPLES | | | | | REFERENCE EXAMPLES | | | |
|---|---|---|---|---|---|---|---|---|---|
|  | 1 | 2 | 3 | 4 | 5 | 1 | 2 | 3 | 4 |
| Amount of Catalytic Material × ($10^{-2}$ g)* | 2.65 | 2.88 | 2.90 | 2.93 | 2.87 | 3.76 | 2.28 | 3.48 | 3.20 |
| Reaction Temperature (°C.) | NO Conversion (%) | | | | | | | | |
| 250 | 89.4 | 90.6 | 88.7 | 91.3 | 88.8 | 81.1 | 79.0 | 84.2 | 87.6 |
| 300 | 97.0 | 97.9 | 96.5 | 98.2 | 96.5 | 92.7 | 91.4 | 93.7 | 96.2 |
| 350 | 99.2 | 99.4 | 99.0 | 99.6 | 98.9 | 97.3 | 96.6 | 98.1 | 98.9 |
| Durability (g) | 0.21 | 0.18 | 0.27 | 0.19 | 0.21 | 2.77 | 4.85 | — | 0.34 |

*Per contact surface area.

Further to make clear the difference in durability of the catalyst of EXAMPLE 2 and REFERENCE EXAMPLE 4, each catalyst was charged in a reactor through which a gas mixture composed of about 100 ppm of NO, 1% by weight of oxygen, 10% by weight of water vapor, about 50 ppm of sulfur dioxide and the residue nitrogen, and containing dusts in an amount of about 100 mg/Nm$^3$, was passed at a temperature of 350° C. at an area velocity of 20 Nm$^3$/m$^2$.hr. The results are shown in TABLE 2.

TABLE 2

| Catalysts | NO CONVERSION (%) Reaction Time (hr) | | |
|---|---|---|---|
|  | 1000 | 5000 | 10000 |
| EXAMPLE 2 | 99.2 | 99.4 | 99.3 |
| REF. EXAMPLE 4 | 98.1 | 93.1 | 89.5 |

It is understood that the catalysts of REFERENCE EXAMPLES 1 and 3 have lower activities in spite of the larger amount of catalytic material supported per contact surface area and the catalysts of REFERENCE EXAMPLES 1 and 2 are lacking in durability than the catalysts of the invention from TABLE 1.

It is further understood that the catalyst of REFERENCE EXAMPLE 4 is less active in particular than that of EXAMPLE 5, when taken in consideration that the amount of carrier material per contact surface area, and remarkably less anti-abrasive from TABLE 2.

What is claimed is:

1. A method for producing a catalyst structure in the form of porous sheet or honeycomb for the gas phase reduction of nitrogen oxides in the presence of ammonia, which comprises:
   (a) bearing at least one of inorganic fibers of about 1-20 mm in fiber length and of about 0.1-30 microns in average diameter selected from the group consisting of ceramic fiber, silica fiber, silica-alumina fiber, chrysotile fiber, asbestos fiber, rock wool, glass fiber, anthophyllite fiber, potassium titanate fiber and carbon fiber, in water, to form a stock material containing the solid components in an amount of 1-10% by weight;
   (b) forming the stock material into a sheet by paper making means and drying to produce a sheet which has a void fraction of 65-80%;
   (c) impregnating the sheet or a honeycomb structure manufactured therefrom with an impregnating slurry containing titanium dioxide as a carrier material or its precursor which will be converted into titanium dioxide when calcined in a concentration at least of 100 g/l and having a viscosity of 5-250 cps. at normal temperature, drying, and when necessary calcining the structure; and
   (d) immersing the structure in a solution containing at least one catalytically active agent of an oxide selected from the group consisting of Cu, Fe, V, W and Mo or their precursors which will be converted into the oxides when calcined, drying and calcining the structure.

2. The method as claimed in claim 1 wherein titanium dioxide or its precursor which will be converted into titanium dioxide when calcined is admixed with the stock material so that the stock material contains the solid components in an amount of about 1-10% by weight which consist of not more than about 40% by weight of titanium dioxide or its precursor and not less than about 60% by weight of the fiber.

3. The method as claimed in claim 1 wherein the inorganic fiber is beaten together with a combustible organic fiber in amounts of about 1-30% by weight based on the inorganic fiber.

4. The method as claimed in claim 1 wherein titanium dioxide used in the preparation of impregnating slurry contains free sulfate ions in amounts not more than 4% by weight based on the titanium dioxide, and has a specific surface area of 50-100 $m^2/g$.

* * * * *